US011893033B2

(12) United States Patent
Nalliakodan et al.

(10) Patent No.: US 11,893,033 B2
(45) Date of Patent: Feb. 6, 2024

(54) AUTOMATED ANALYSIS OF UNSTRUCTURED COMPUTER TEXT FOR GENERATION OF AN ENFORCEMENT ACTION DATABASE USING MACHINE LEARNING

(71) Applicant: FMR LLC, Boston, MA (US)

(72) Inventors: Suresh Nalliakodan, Chennai (IN); Deepak Venkatachalapathi, Chennai (IN); Dmitry Bisikalo, Framingham, MA (US); Rijesh Panicker, Bangalore (IN); Seth Brooks, Westwood, MA (US); Sharon Botwinik, Wayland, MA (US)

(73) Assignee: FMR LLC, Boston, MA (US)

( * ) Notice: Subject to any disclaimer, the term of this patent is extended or adjusted under 35 U.S.C. 154(b) by 144 days.

(21) Appl. No.: 17/684,283

(22) Filed: Mar. 1, 2022

(65) Prior Publication Data
US 2023/0281208 A1    Sep. 7, 2023

(51) Int. Cl.
*G06F 16/2457* (2019.01)
*G06F 16/25* (2019.01)
*G06F 40/295* (2020.01)
*G06F 40/284* (2020.01)
*G06F 16/22* (2019.01)

(52) U.S. Cl.
CPC .... *G06F 16/24578* (2019.01); *G06F 16/2282* (2019.01); *G06F 16/258* (2019.01); *G06F 40/284* (2020.01); *G06F 40/295* (2020.01)

(58) Field of Classification Search
None
See application file for complete search history.

(56) References Cited

U.S. PATENT DOCUMENTS

| | | | |
|---|---|---|---|
| 9,740,771 B2 | 8/2017 | Byron et al. | |
| 10,353,905 B2 * | 7/2019 | Ramachandran | G06F 40/284 |
| 10,424,016 B2 | 9/2019 | Byron et al. | |
| 10,796,104 B1 * | 10/2020 | Lee | G06N 20/00 |
| 10,880,614 B2 * | 12/2020 | Favicchio | H04N 21/466 |
| 11,194,962 B2 * | 12/2021 | Biswas | G06N 3/045 |
| 2015/0356463 A1 | 12/2015 | Overell et al. | |
| 2016/0314123 A1 * | 10/2016 | Ramachandran | G06F 16/24578 |
| 2016/0350544 A1 * | 12/2016 | Wong | G06F 21/62 |
| 2019/0318363 A1 | 10/2019 | Marascu et al. | |

(Continued)

*Primary Examiner* — Kim T Nguyen
(74) *Attorney, Agent, or Firm* — Cesari & McKenna, LLP

(57) ABSTRACT

Methods and apparatuses are described in which unstructured computer text is analyzed for generation of an enforcement action database. A computing device receives a digital document comprising a corpus of unstructured text and converts each sentence into tokens. The computing device identifies entities in the tokens and classifies each sentence as relevant or not relevant to an enforcement action. For each relevant sentence, the computing device generates a record in a first data structure and generates a record in a second data structure. The computing device maps the records in the first data structure to the records in the second data structure based upon an enforcement attribute to generate a third data structure. The computing device aggregates the records in the third data structure based upon a name of the entity and a type of the entity in the sentence to determine an aggregated first enforcement attribute for each entity.

24 Claims, 10 Drawing Sheets

(56) References Cited

U.S. PATENT DOCUMENTS

| | | |
|---|---|---|
| 2020/0090033 A1 | 3/2020 | Ramachandran et al. |
| 2020/0387675 A1* | 12/2020 | Nugent .................. G06F 16/35 |
| 2021/0004539 A1* | 1/2021 | Lee ....................... G06F 40/284 |
| 2021/0043211 A1* | 2/2021 | Leidner ................. G06F 16/35 |
| 2023/0047800 A1* | 2/2023 | Suryanarayanan ... G06F 16/254 |
| 2023/0281208 A1* | 9/2023 | Nalliakodan ......... G06F 40/295 |
| | | 707/723 |

* cited by examiner

Acme ORG agreed to a $20 million MONEY penalty. Doe PERSON agreed to a $250,000 MONEY penalty. Smith PERSON agreed to pay a $100,000 MONEY penalty and to provide disgorgement and prejudgment interest of $454,145 MONEY attributable to selling Acme ORG stock during the relevant period at inflated prices.

402

406

According to the complaint, the company's investor presentations, press releases, and SEC ORG filings stated that the drug was effective 60 percent PERCENT of the time, far higher than suggested by actual results available internally.

| Entity Name | Enforcement Fine Type | Aggregated Fine Amount | Regulator |
|---|---|---|---|
| Acme Oncology Inc. | Fines and Monetary Penalties | $20,000,000 | SEC |
| Bank of Anywhere | Disgorgement and Interest | $850,000 | SEC |
| Bob Stevenson | Fines and Monetary Penalties | $150,000 | SEC |
| ... | ... | ... | ... |

Entity Type
Name
Firm Type
Regulator: SEC

Rule Violated
Date Range: 2020-01-17 To 2021-02-28

SEARCH 902
904
900

FIG. 10

| Entity Name | Regulator | Date Range | |
|---|---|---|---|
| Bank of Anywhere | SEC | 2020-01-17 To 2021-02-28 | 1002 |

| Total Fines | # of Enforcement Actions |
|---|---|
| $850,000  1004 | 4  1006 |

| Enforcement Action Date | Enforcement Fine Type | Fine Amount | Enforcement Action Text |
|---|---|---|---|
| 06/05/2020 | Disgorgement and Interest | $75,000 | PDF |
| 06/05/2020 | Fines and Monetary Penalties | $425,000 | PDF |
| 09/22/2020 | Fines and Monetary Penalties | $150,000 | PDF |
| 01/08/2021 | Fines and Monetary Penalties | $200,000 | PDF |

1008

1000

US 11,893,033 B2

AUTOMATED ANALYSIS OF UNSTRUCTURED COMPUTER TEXT FOR GENERATION OF AN ENFORCEMENT ACTION DATABASE USING MACHINE LEARNING

TECHNICAL FIELD

This application relates generally to methods and apparatuses, including computer program products, for automated analysis of unstructured computer text for generation of an enforcement action database using machine learning.

BACKGROUND

Many organizations, particularly in industries that are highly regulated by government, monitor enforcement actions taken by such governmental entities (e.g., SEC, FINRA) in order to comply with regulatory requirements and/or provide intelligence to relevant groups within the organization. Most commonly, such enforcement actions are published by the governmental entities via digital documents that comprise unstructured text detailing the enforcement action. Organizations that track these enforcement actions must periodically retrieve the digital documents and have a reviewer analyze the documents and transfer the relevant enforcement information into a separate data store. In some cases, organizations attempt to use automated ingestion of such digital documents. However, due to the complexity of the document text and lack of a consistent, organized standard to convey the information that that the organization is seeking, such automated systems either cannot capture the desired information or capture only a portion of the desired information. In both cases, the automated systems often capture irrelevant or incorrect information which degrades the quality and accuracy of the enforcement action data maintained by the organization. In addition, there is typically more rework required (e.g., checking, re-checking) of the results of such automated systems due to the lack of consistency and accuracy—which delays the acquisition of a results set. Finally, due to inconsistent classification of documents, such automated systems usually cannot capture historic trends of enforcement action data over time.

SUMMARY

Therefore, what is needed are methods and systems for automatically transforming digital documents that contain a corpus of unstructured text into a set of tokens that can be analyzed and processed to generate data structures comprising a summary of enforcement action data contained in the digital documents without necessitating manual intervention. The techniques described herein beneficially provide for the use of advanced natural language processing (NLP) algorithms to intuitively parse the digital documents to identify named entities and amounts in the documents and determine whether such information is relevant or not to a particular enforcement action. The present systems and methods also enable the consideration of additional types of documents over existing document processing systems due to the scalability and efficiency of the processing algorithms described herein and the lack of manual review of the documents. The techniques further have the advantage over existing systems of generating historical trends across document sets based upon the continuous analysis of new documents and storage of the results, and also being able to de-prioritize low priority documents and/or prioritizing the most important documents (based upon the results set) for additional review.

The invention, in one aspect, features a computer system in which unstructured computer text is analyzed for generation of an enforcement action database using machine learning. The system comprises a computing device having a memory for storing computer-executable instructions and a processor that executes the computer-executable instructions. The computing device receives a digital document comprising a corpus of unstructured text and converts each sentence in the corpus of unstructured text into a set of tokens. The computing device identifies one or more entities in each set of tokens, transforms the identified entities into a normalized form, and classifies each sentence in the corpus of unstructured text as relevant to an enforcement action or not relevant to an enforcement action. For each sentence classified as relevant to an enforcement action, the computing device: generates a record in a first data structure, the record in the first data structure comprising a name of an entity in the sentence, a type of the entity in the sentence, and a first enforcement attribute, and generates a record in a second data structure, the record in the second data structure comprising the first enforcement attribute and a second enforcement attribute. The computing device maps the records in the first data structure to the records in the second data structure based upon the enforcement attribute in each data structure to generate a third data structure, each record in the third data structure comprising the name of the entity in the sentence, the type of the entity in the sentence, the first enforcement attribute, and the second enforcement attribute. The computing device aggregates the records in the third data structure based upon the name of the entity in the sentence and the type of the entity in the sentence to determine an aggregated first enforcement attribute for each entity in the third data structure.

The invention, in another aspect, features a computerized method in which unstructured computer text is analyzed for generation of an enforcement action database using machine learning. A computing device receives a digital document comprising a corpus of unstructured text and converts each sentence in the corpus of unstructured text into a set of tokens. The computing device identifies one or more entities in each set of tokens, transforms the identified entities into a normalized form, and classifies each sentence in the corpus of unstructured text as relevant to an enforcement action or not relevant to an enforcement action. For each sentence classified as relevant to an enforcement action, the computing device: generates a record in a first data structure, the record in the first data structure comprising a name of an entity in the sentence, a type of the entity in the sentence, and a first enforcement attribute, and generates a record in a second data structure, the record in the second data structure comprising the first enforcement attribute and a second enforcement attribute. The computing device maps the records in the first data structure to the records in the second data structure based upon the enforcement attribute in each data structure to generate a third data structure, each record in the third data structure comprising the name of the entity in the sentence, the type of the entity in the sentence, the first enforcement attribute, and the second enforcement attribute. The computing device aggregates the records in the third data structure based upon the name of the entity in the sentence and the type of the entity in the sentence to determine an aggregated first enforcement attribute for each entity in the third data structure.

Any of the above aspects can include one or more of the following features. In some embodiments, converting each sentence in the corpus of unstructured text into a set of tokens comprises: providing the corpus of unstructured text as input to a natural language processing algorithm; parsing, by the natural language processing algorithm, the corpus of unstructured text to identify each sentence in the corpus of unstructured text; and generating, by the natural language processing algorithm, a token for each word in each sentence. In some embodiments, identifying one or more entities in each set of tokens comprises, for each token in the set of tokens: determining, for each token in the set of tokens, that the token is located in an entity database; identifying an entity in the entity database that corresponds to the token; and assigning a name of the entity and a type of the entity to the token based upon the entity database.

In some embodiments, converting each sentence in the corpus of unstructured text into a set of tokens comprises removing one or more stopwords from the sentence. In some embodiments, classifying each sentence in the corpus of unstructured text as relevant to an enforcement action or not relevant to an enforcement action comprises discarding sentences that are classified as not relevant to an enforcement action. In some embodiments, the computing device classifies a sentence as relevant to an enforcement action when the sentence comprises one or more enforcement keywords and/or one or more enforcement fine amounts. In some embodiments, the computing device classifies a sentence as relevant to an enforcement action when the one or more enforcement keywords are within a predetermined proximity to the one or more enforcement fine amounts. In some embodiments, the computing device classifies a sentence as not relevant to an enforcement action when the sentence comprises one or more entities that are unrelated to an enforcement action. In some embodiments, the one or more entities are unrelated to an enforcement action when the one or more entities are of a type that is unrelated to an enforcement action.

In some embodiments, mapping the records in the first data structure to the records in the second data structure based upon the enforcement fine amount in each data structure comprises: selecting a first record from the first data structure that has a first enforcement attribute; selecting one or more records from the second data structure that have a second enforcement attribute that matches the first enforcement attribute; and merging the first record from the first data structure and the selected one or more records from the second data structure to create a new set of records. In some embodiments, the computing device inserts the new set of records into the third data structure. In some embodiments, the computing device generates a visual representation of the records from the third data structure for display on a remote computing device.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 4 is a diagram of exemplary sentence classification.

FIG. 9 is a diagram of an exemplary graphical user interface for searching enforcement actions.

FIG. 10 is a diagram of an exemplary graphical user 1000 for viewing enforcement action details.

DETAILED DESCRIPTION

Figure 1:
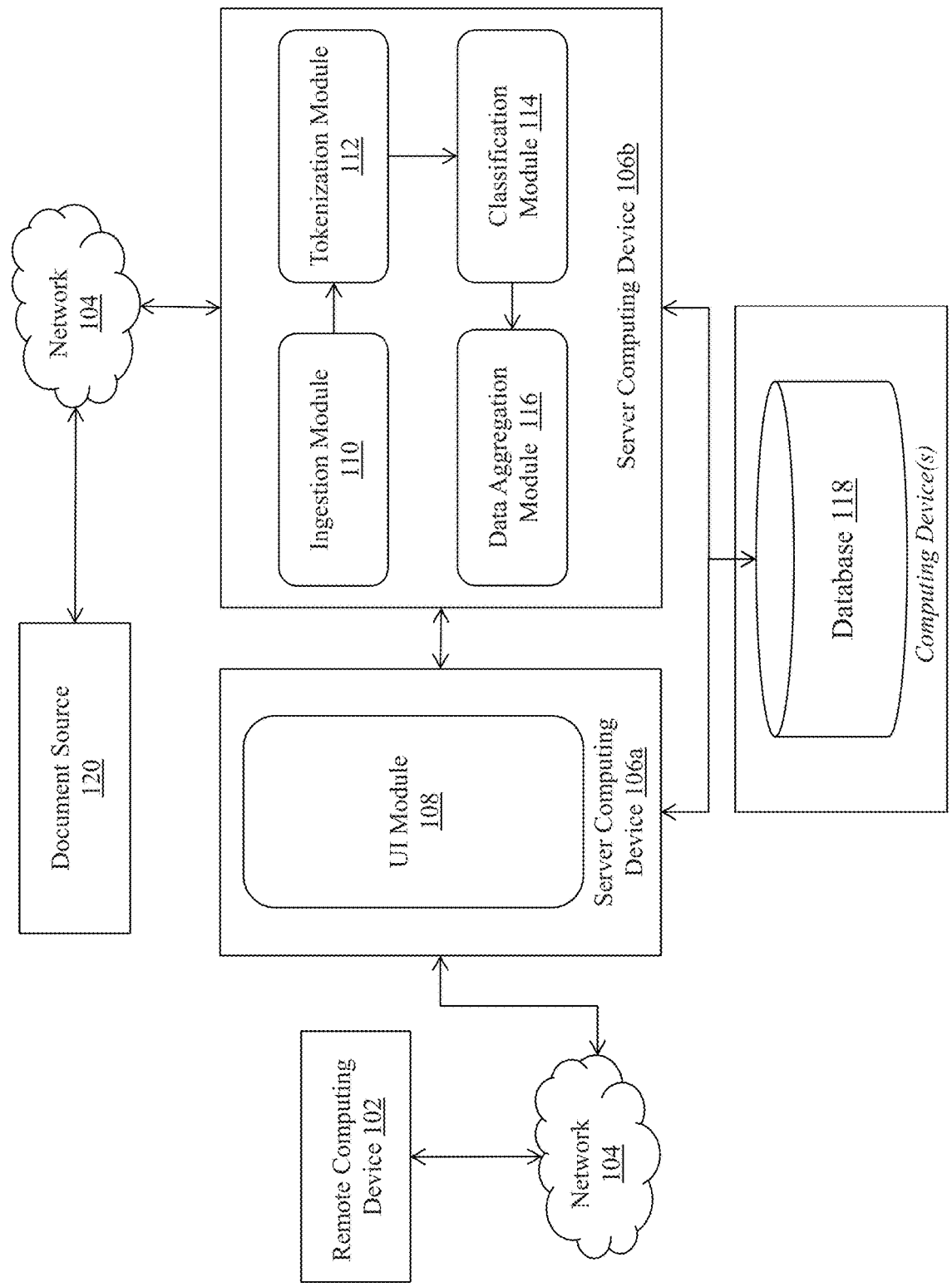
FIG. 1 is a block diagram of a system in which unstructured computer text is analyzed for generation of an enforcement action database using machine learning.

FIG. 1 is a block diagram of a computer system 100 in which unstructured computer text is analyzed for generation of an enforcement action database using machine learning. The system 100 includes a remote computing device 102, communications networks 104a and 104b, a server computing device 106a that has a user interface (UI) module 108, a server computing device 106b that has an ingestion module 110, a tokenization module 112, a classification module 114, and a data aggregation module 116. The system 100 also includes a database 118 and a document source 120.

The remote computing device 102 connects to the communications network 104a in order to communicate with the server computing device 106 to provide input and receive output relating to the process of analyzing unstructured computer text for generation of an enforcement action database using machine learning as described herein. In some embodiments, the remote computing device 102 is coupled to a display device (not shown). For example, the remote computing device 102 can provide a graphical user interface (GUI) via the display device that presents output resulting from the methods and systems described herein, where a user of the remote computing device 102 interacts with the user interface to request application functionality, provide data input and commands, and the like for the purpose of analyzing unstructured computer text for generation of an enforcement action database using machine learning as described herein.

Exemplary remote computing devices 102 include but are not limited to desktop computers, laptop computers, tablets, mobile devices, smartphones, and internet appliances. It should be appreciated that other types of computing devices that are capable of connecting to the components of the system 100 can be used without departing from the scope of invention. Although FIG. 1 depicts a single remote computing device 102, it should be appreciated that the system 100 can include any number of remote computing devices.

The communications networks 104a and 104b enable the other components of the system 100 to communicate with each other in order to perform the process of analyzing unstructured computer text for generation of an enforcement action database using machine learning as described herein. The networks 104a and 104b may be a local network, such as a LAN, or a wide area network, such as the Internet and/or a cellular network. In some embodiments, the networks 104a and 104b are comprised of several discrete networks and/or sub-networks (e.g., cellular to Internet) that enable the components of the system 100 to communicate with each other.

The server computing devices 106a and 106b are each a combination of hardware, including one or more special-purpose processors and one or more physical memory modules, and specialized software modules—such as UI module 108 that executes on the processor of the server computing device 106a, and ingestion module 110, tokenization module 112, classification module 114, and data aggregation module 116 that execute on the processor of the server computing device 106b—to receive data from other components of the system 100, transmit data to other components of the system 100, and perform functions for analyzing unstructured computer text for generation of an enforcement action database using machine learning as described herein. In some embodiments, the modules 108 through 116 are specialized sets of computer software instructions programmed onto a dedicated processor in the corresponding server computing device 106a or 106b and can include specifically-designated memory locations and/or registers for executing the specialized computer software instructions. Further explanation of the specific processing performed by the modules 108 through 116 will be provided throughout the specification.

It should be appreciated that, in some embodiments, the functionality of any or all of the modules 108 through 116 can be programmed on the remote computing device 102 as a 'standalone' application for the purposes described herein. For example, in some embodiments the modules 108 through 116 can be packaged into an application that is installed on the remote computing device 102—also called a native application or "app." The native application can be a software application is installed locally on the remote computing device 102 and written with programmatic code designed to interact with an operating system that is native to the remote computing device 102. Such software is available from, e.g., the Apple® App Store or the Google® Play Store. In some embodiments, the native application includes a software development kit (SDK) module that is executed by a processor of the remote computing device 102 to perform functions associated with analyzing unstructured computer text for generation of an enforcement action database using machine learning as described herein. The native application can be executed when the remote computing device 102 is online—that is, communicatively coupled to a network, such as the Internet—or offline.

It should be appreciated that, in some embodiments, any or all of the functionality of modules 108 through 116 can be provided by the server computing devices 106a or 106b via a browser application on the remote computing device 102. A browser typically comprises software executing on a processor of the remote computing device 102 that enables the remote device to communicate via HTTP or HTTPS with the server computing device 106 (e.g., a web server addressable with uniform resource locators (URLs)) to receive website-related content, including one or more webpages that contain user interface content, for rendering in the browser application and presentation on a display device coupled to the remote computing device 102. Exemplary mobile browser application software includes, but is not limited to, Firefox™ Chrome™, Safari™, and other similar software. The one or more webpages can comprise visual and audio content for display to and interaction with a user of the remote device 102.

Although the modules 108 through 116 are shown in FIG. 1 as executing within corresponding server computing devices 106a and 106b, in some embodiments the functionality of the modules 108 through 116 can be distributed among many server computing devices or consolidated onto a single server computing device. As shown in FIG. 1, the server computing device 106a is in communication with server computing device 106b, which enables the modules 108 through 116 to communicate with each other, and with database 118 and document source 120, in order to exchange data for the purpose of performing the described functions. It should be appreciated that any number of computing devices, arranged in a variety of architectures, resources, and configurations (e.g., networked computing, cluster computing, virtual computing, cloud computing) can be used without departing from the scope of the technology described herein.

The database 118 is a computing module that is configured to receive, generate, and store specific segments of data relating to the process of analyzing unstructured computer text for generation of an enforcement action database using machine learning as described herein. In some embodiments, all or a portion of the database 118 can be integrated with the server computing device 106a and/or server computing device 106b In some embodiments (as shown in FIG. 1), the database 118 can be located on a separate computing device or devices, available either local connection or remote connection (e.g., cloud-based services). The database 118 can comprise one or more databases configured to store portions of data used by the other components of the system 100, as will be described in greater detail below. In some embodiments, the database 118 functions as a data repository to store computing files (such as digital document files and/or pointers to such digital document files) in memory and/or on disk. For example, the database 118 can be remote accessed via a LAN/WAN, or the database 118 can be internal to the server computing device 106a, server computing device 106b, and/or remote computing device 102.

The document source 120 is a computing module that is configured to store and distribute digital documents that are ingested by the server computing device 106b for processing and analysis as described herein. The document source 120 is coupled to the server computing device 106b via network 104b. In some embodiments, the document source 120 is a computing device or computing devices that are configured to receive document requests from server computing device 106b and distribute digital documents to server computing device 106b as part of a periodic schedule (e.g., every day at a predetermined time). For example, the ingestion module 110 of server computing device 106b can establish a connection to document source 120 at a scheduled time (e.g., via API, HTTP connection, data feed, or similar communication/networking protocols and/or paradigms) and download new and/or updated digital documents from document source 120. In some embodiments, the document source 120 comprises a website that is managed by a governmental regulator (e.g., FINRA, SEC) which posts documents describing enforcement actions into the document source 120 for retrieval by external systems.

Figure 2:
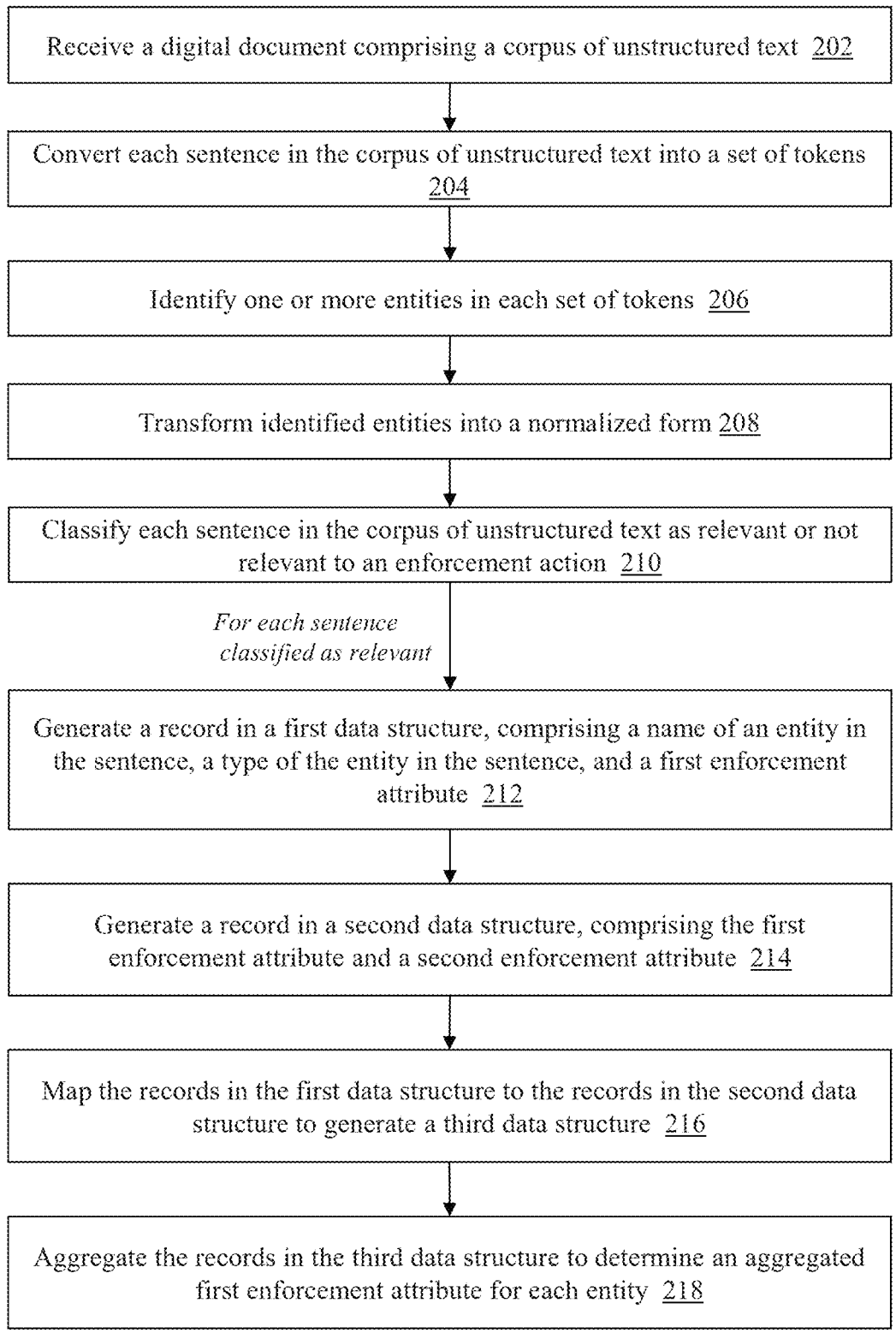
FIG. 2 is a flow diagram of a computerized method in which unstructured computer text is analyzed for generation of an enforcement action database using machine learning.

FIG. 2 is a flow diagram of a computerized method 200 in which unstructured computer text is analyzed for generation of an enforcement action database using machine learning, using the system 100 of FIG. 1. The ingestion module 110 receives (step 202) receives (step 202) a digital document comprising a corpus of unstructured text. In some embodiments, the digital document can comprise a particular file format, such as .pdf, .doc, .xml, .html, and the like.

In one embodiment, the ingestion module 110 retrieves the digital document from database 118. In another embodiment, the ingestion module 110 receives the digital document from document source 120. For example, a governmental body or regulatory agency may periodically publish digital documents, such as enforcement actions in the case of the SEC, and the tokenization module 110 can connect to document source 120 maintained by the regulatory agency and retrieve any newly-published digital documents for storage in database 118 and corresponding processing as described herein. In the case where the digital document is received in a particular file format, the ingestion module 110 can perform one or more pre-processing steps on the digital document to generate a corpus of unstructured text from the document contents for tokenization. For example, the ingestion module 110 can convert the digital document from its native file format into a corpus of unstructured text using, e.g., known conversion techniques such as optical character recognition (OCR).

After the ingestion module 110 receives the document and generates the corpus of unstructured text, the tokenization module 112 converts (step 204 of FIG. 2) each sentence in the corpus of unstructured text into a set of tokens. The tokenization process comprises parsing the corpus of unstructured text into tokens, where each sentence is converted into one or more tokens. Generally, a token corresponds to a meaningful segment of the given sentence, whether it comprises one word or a sequence of words. It should be appreciated that in some instances, one or more single words in a sentence are converted into tokens while in some instances, the tokenization module 112 can generate a token for a plurality of words and/or a phrase in a given sentence. In some embodiments, the tokenization module 112 can utilize a term dictionary, language reference, and/or library stored in database 118 to perform the tokenization. For example, the module 112 can determine one or more phrases in a given sentence using the term dictionary by comparing a sequence of words in the sentence to one or more predefined terms or phrases in the database 118. When the module 112 identifies that a sequence of words in the sentence corresponds to one of the predefined terms or phrases, the module 112 can convert the sequence of words into a single token.

In some embodiments, the tokenization module 112 uses one or more natural language processing (NLP) algorithms to convert each sentence in the corpus of unstructured text into a set of tokens. An exemplary suite of NLP algorithms and functions that can be used by the module is the spaCy library available from spacy.io. The module 112 can provide the corpus of unstructured text as input to an NLP algorithm, which parses the corpus to identify each sentence. For example, the NLP algorithm can identify a location of one or more certain punctuation marks ('.', '?', '!') in the corpus of text and identify the text between each set of punctuation marks as comprising a sentence. Then, the module 112 can generate the set of tokens for the sentence as described above. In some embodiments, the NLP algorithm can be configured to use more complex grammatical rules and context to identify the sentences in the corpus of text and to distinguish between punctuation marks that do not designate the end of a sentence (e.g., such as in the abbreviation "U.S." for United States) versus those that do.

In some embodiments, during the tokenization process the tokenization module 112 can perform other processing steps, such as lemmatization, stemming, removal of stopwords, determining part-of-speech for a given word or phrase, determining syntax associated with words or sentences, and the like. Each of these functions may be performed by the NLP algorithm of the tokenization module 112, such as spaCy.

It should be appreciated that in some embodiments, the tokenization module 112 leverages advanced classification and machine learning techniques such as convolutional neural networks and predictive modeling to determine various attributes of the corpus of text, including entity types, entity names, monetary amounts, and the like. In one example, the tokenization module 112 can utilize the spaCy library to perform some or all of the processing steps (e.g., part-of-speech recognition, named entity recognition, grammar dependencies, etc.) via deep learning computational methods.

Once the corpus of text has been converted into tokens, the tokenization module 112 identifies (step 206 of FIG. 2) one or more entities in each set of tokens. As part of the process of identifying entities in each set of tokens, the tokenization module 112 can annotate the corpus of unstructured text according to the identified entities. In one embodiment, the module 112 can use a Named Entity Recognition (NER) function on the set of tokens to determine which token(s) correspond to an identifiable named entity. An exemplary NER function used by the tokenization module 112 is the EntityRecognizer component of the spaCy API (spacy.io/api/entityrecognizer). When the tokenization module 112 encounters a token that corresponds to a named entity, the module 112 can identify that the token corresponds to a named entity and associate the token with a given entity type, resulting in an annotated set of tokens that includes the named entity information.

The tokenization module 112 transforms (step 208 of FIG. 2) the identified entities into a normalized form. In some embodiments, the tokenization module 112 employs coreference resolution to normalize the entities. Coreference resolution is the task of finding all linguistic expressions (called mentions) in a given text that refer to the same entity; it also helps to resolve the mentions by replacing them with appropriate noun phrases. In an example, ACME Oncology Inc may be referred as 'ACME' in the corpus of unstructured text. The module 112 can resolve any instance of 'ACME' that is identified in the unstructured text to its normalized form, i.e. ACME Oncology Inc. In some embodiments, the tokenization module 112 performs dependency parsing on the corpus of unstructured text. Dependency parsing is the task of analyzing the grammatical structure in a sentence and finding out related words as well as the type of the relationship between them. For example, in the sentence "ACME agreed to a $20 million penalty, and Doe agreed to a $250,000 penalty," the module 112 associates the entity 'ACME' with '$20 million penalty' and associates the entity 'Doe' with '$250,000 penalty.' These associations can be used by other modules of the system 100 (e.g., classification module 114, data aggregation module 116) to generate the data structures as described herein.

Figure 3:
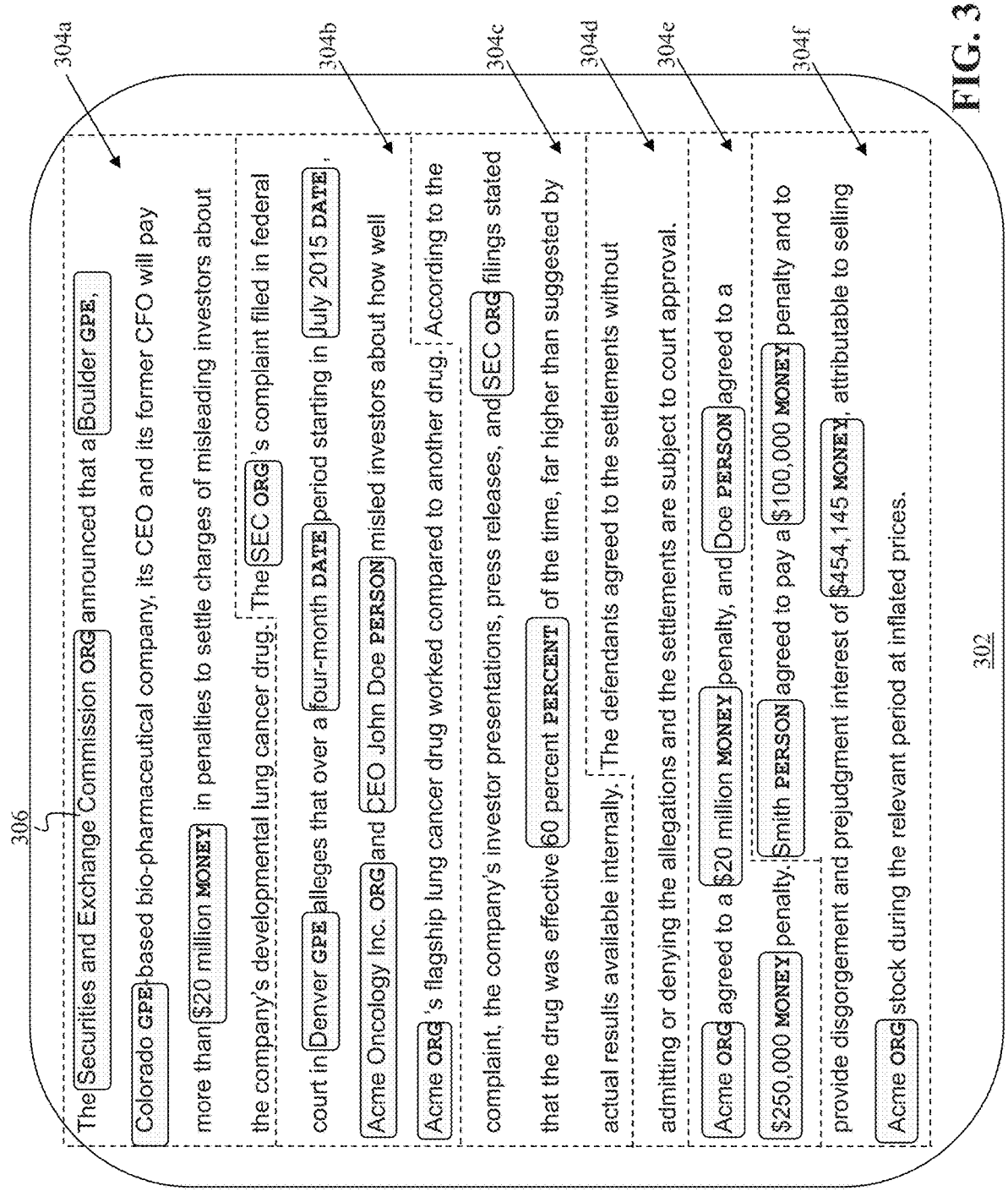
FIG. 3 is a diagram of exemplary sentence tokenization and annotation.

FIG. 3 is a diagram of exemplary sentence tokenization and annotation as conducted by the tokenization module 112. As shown in FIG. 3, the tokenization module 112 parses the corpus of text 302 to generate a set of tokens for each sentence (e.g., set 304a-304f) as well as identifying named entities in the tokens (e.g., token 306) and annotating the corpus based upon the named entities. For example, the module 112 identifies token 306 as a named entity, i.e., "The Securities and Exchange Commission," and assigns an entity type of "ORG" to the token. Other entity types include, but are not limited to, "PERSON," "PERCENT," "MONEY," "DATE," and "GPE" (geopolitical entity). For visualization purposes, the token and entity type label for each named entity are highlighted in FIG. 3.

After the tokenization module 112 tokenizes and annotates the corpus of unstructured text as described above, the classification module 114 of server computing device 106b classifies (step 210) each sentence in the corpus of unstructured text as relevant or not relevant to an enforcement action. In some embodiments, the classification module 114 analyzes the named entities in each set of tokens that comprises a given sentence and determines whether the sentence is relevant to an enforcement action (or not) based upon the named entities in the set of tokens. In one example, the classification module 114 can classify a sentence as relevant to an enforcement action when the sentence comprises one or more tokens that are assigned the ORG or PERSON entity type, one or more tokens that are assigned the MONEY entity type, and one or more tokens that comprise certain terms or keywords. In another example, the classification module 114 can classify a sentence as not relevant to an enforcement action when the sentence does not comprise at least one token that is assigned an ORG or PERSON entity type, at least one token that is assigned a MONEY entity type, and at least one predefined term or keyword.

FIG. 4 is a diagram of exemplary sentence classification as conducted by the classification module 114. It should be appreciated that for ease of explanation, only a portion of the unstructured text from FIG. 3 is shown in FIG. 4, but the classification module 114 performs the sentence classification process on all sentences in the corpus of text. As shown in FIG. 4, the classification module 114 classifies sentence 402 as being relevant to an enforcement action while the module 114 classifies sentence 404 as not being relevant to an enforcement action. Sentence 402 comprises four tokens that are assigned a MONEY entity type, four tokens that are assigned an ORG or PERSON entity type, and a plurality of terms and/or keywords, collectively 406 (i.e., "penalty," "disgorgement," "prejudgment interest") that are configured in module 114 as being relevant to enforcement. In contrast, while sentence 404 comprises a token of ORG entity type and a token of MONEY entity type, the classification module 114 does not classify the sentence 404 as relevant to an enforcement action because the sentence 404 does not contain any tokens that comprise a particular keyword that the module 114 understands as relevant to enforcement. It should be appreciated that other types of classification rules can be envisioned within the scope of the technology described herein.

Figure 5:
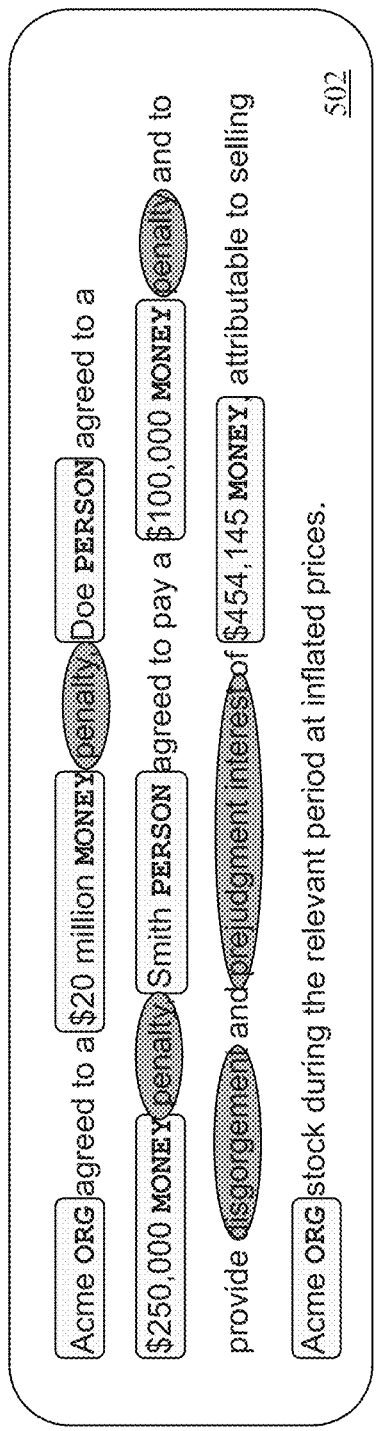
FIG. 5 is a diagram of exemplary record generation for the first data structure.

After the classification module 114 completes classification of the sentences for relevance to an enforcement action, the data aggregation module 116 generates (step 212 of FIG. 2) a record in a first data structure (e.g., a table in database 118) with certain information extracted from the tokens in each relevant sentence. In some embodiments, the record comprises a name of an entity in the sentence, a type of the entity in the sentence, and a first enforcement attribute (e.g., a monetary amount). FIG. 5 is a diagram of exemplary record generation for the first data structure as conducted by the data aggregation module 116. It should be appreciated that for ease of explanation, only a portion of the unstructured text from FIG. 3 is shown in FIG. 5, but the data aggregation module 116 performs the record generation process on all sentences in the corpus of text. As shown in FIG. 5, the data aggregation module 116 converts the tokens of the annotated corpus of text 502 into one or more records in the first data structure 504 that correspond to the information in the annotated text. For example, the data aggregation module 116 generates four records from the annotated text, each record comprising the name of an entity (e.g., Acme Oncology Inc., John Doe, Smith), the corresponding entity type, and the money amount (e.g., fine, penalty, interest, etc.) that the data aggregation module 116 associates with the entity that is subject to the enforcement action. As mentioned above, the data aggregation module 116 can use the normalized form of the identified entity (e.g., Acme Oncology Inc., John Doe) as generated by the tokenization module 112. In addition, the data aggregation module 116 can utilize the associations between entities and dollar amounts as generated by the tokenization module 112 using the dependency parsing process described previously in order to generate the records for the first data structure.

Figure 6:
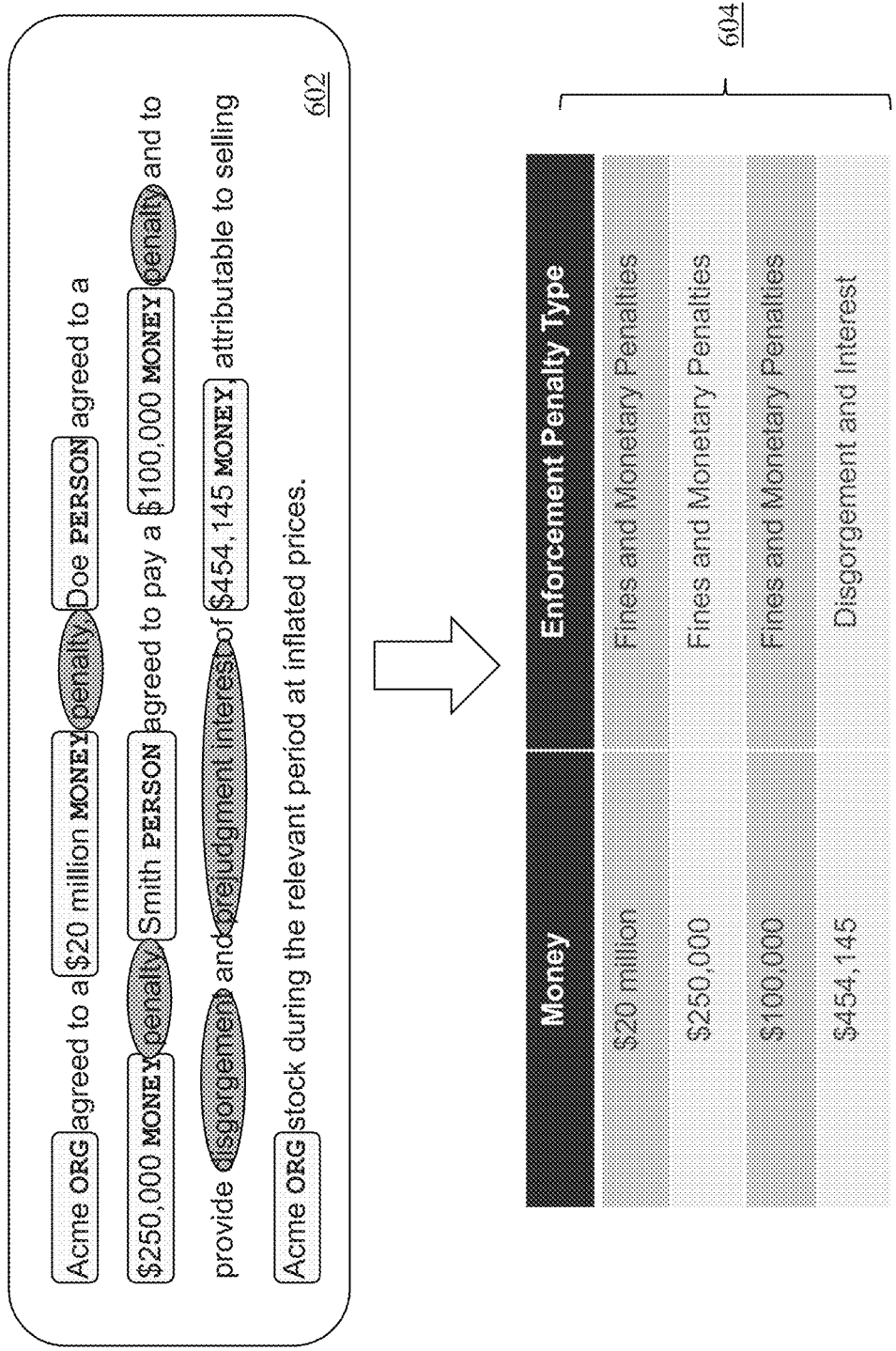
FIG. 6 is a diagram of exemplary record generation for the second data structure.

The data aggregation module 116 also generates (step 214 of FIG. 2) a record in a second data structure (e.g., another table in database 118) with other information extracted from the tokens in each relevant sentence. In some embodiments, the record in the second data structure comprises the first enforcement attribute (i.e., the monetary amount) and a second enforcement attribute. An example of a second enforcement attribute is an enforcement penalty type—e.g., if the money amount is associated with a penalty, the data aggregation module 116 can include an enforcement penalty type of "Fines and Monetary Penalties" as the second enforcement attribute in the record. FIG. 6 is a diagram of exemplary record generation for the second data structure as conducted by the data aggregation module 116. It should be appreciated that for ease of explanation, only a portion of the unstructured text from FIG. 3 is shown in FIG. 6, but the data aggregation module 116 performs the record generation process on all sentences in the corpus of text. As shown in FIG. 6, the data aggregation module 116 converts the tokens of the annotated corpus of text 602 into one or more records in the second data structure 604 that correspond to the information in the annotated text. For example, the data aggregation module 116 generates four records from the annotated text, each record comprising the monetary amount from the first data structure and an enforcement penalty type associated with the monetary amount. In some embodiments, the data aggregation module 116 assigns the enforcement penalty type based upon one or more of the predefined keywords (e.g., "penalty," "disgorgement," etc.) identified in the text by the tokenization module 112 as mentioned previously.

Figure 7:
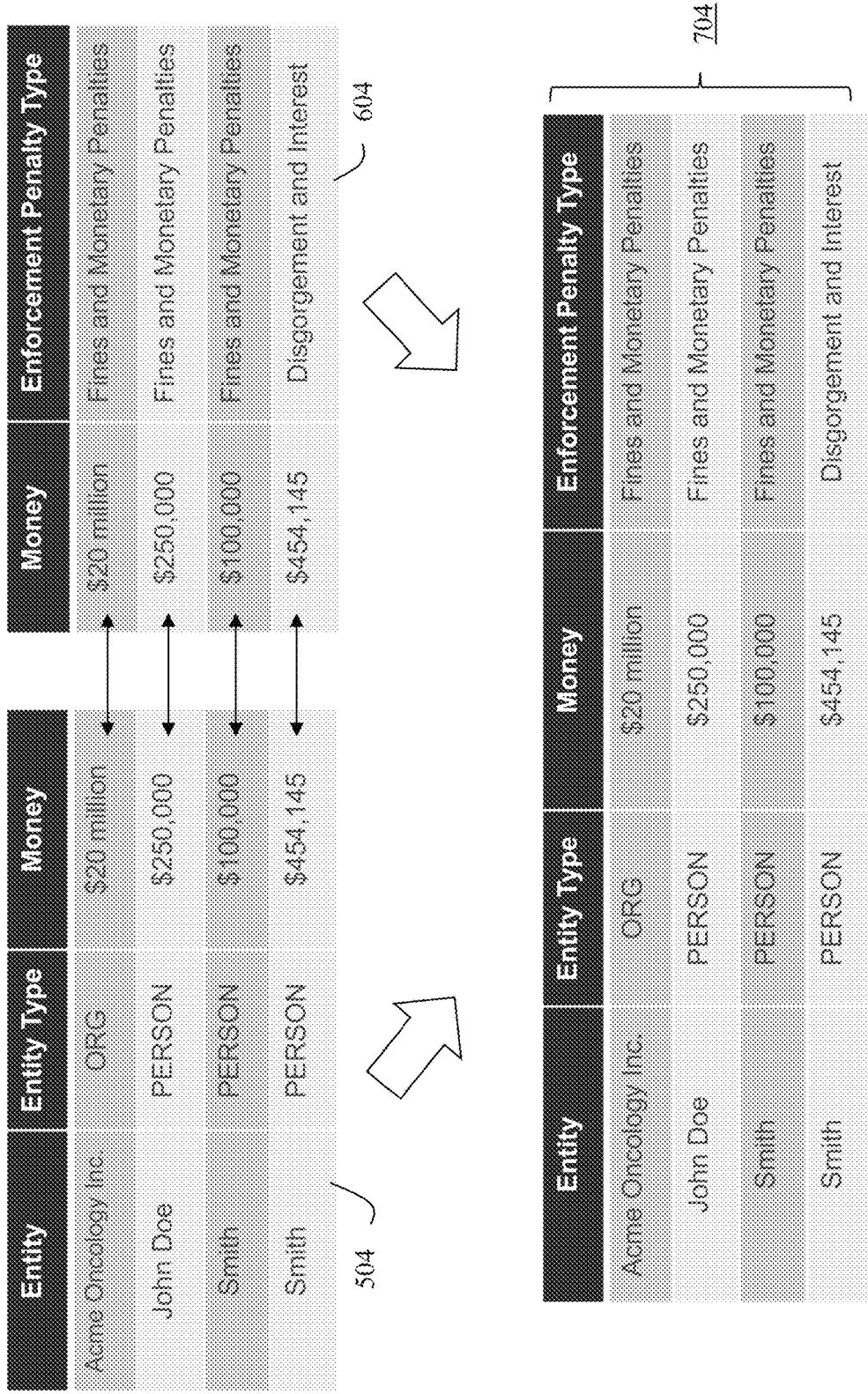
FIG. 7 is a diagram of exemplary record generation for the third data structure.

The data aggregation module 116 then maps (step 216 of FIG. 2) the records in the first data structure to the records in the second data structure to generate a third data structure (e.g., another table in database 118). In some embodiments, each record in the third data structure comprises (i) the name of the entity in the sentence and the type of the entity in the sentence (as set forth in the records in the first data structure) and (ii) the enforcement fine amount and the enforcement fine type (as set forth in the records in the second data structure). In some embodiments, the data aggregation module 116 maps the records from the first and second data structures by matching the enforcement fine amount from each data structure to find records that have the same fine amount, and merging the records together into a single record that is inserted into the third data structure. FIG. 7 is a diagram of exemplary record generation for the third data structure as conducted by the data aggregation module 116. As shown in FIG. 7, the data aggregation module 116 analyzes the records from each of the first data structure (504 from FIG. 5) and the second data structure (604 from FIG. 6) to identify a record from each data structure that has the same fine amount—then merges the records together to create a new record in the third data structure 704 with the corresponding information. For example, the monetary amount from each data structure 504, 604 is consolidated into a single column in the third data structure 704 and the other information from each record is added to the new record in the third data structure 704.

Figure 8:
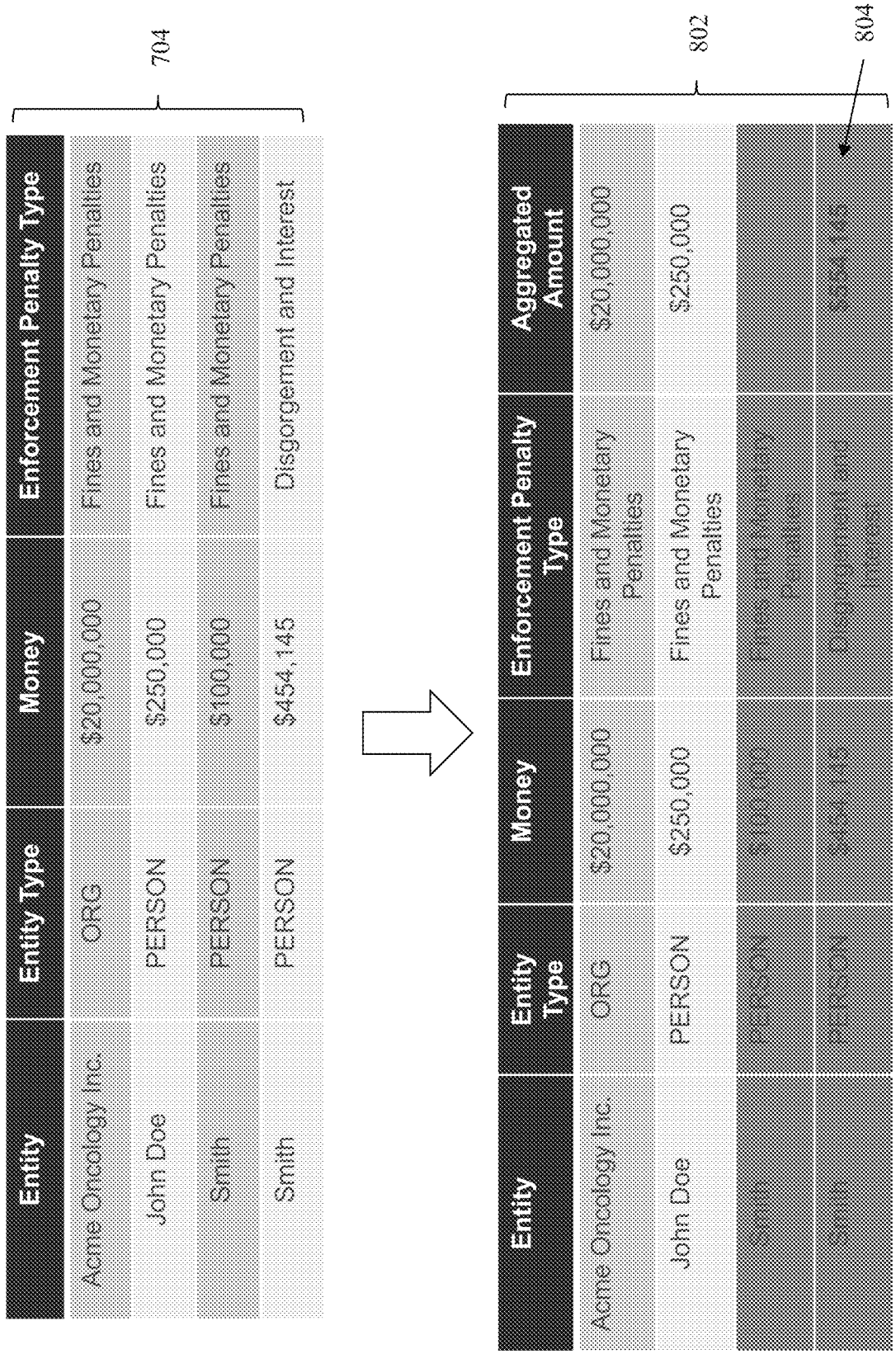
FIG. 8 is a diagram of exemplary record aggregation for records in the third data structure.

Upon creation of the third data structure, the data aggregation module 116 aggregates (step 218 of FIG. 2) the records in the third data structure to determine an aggregated first enforcement attribute for each entity. In some embodiments, the data aggregation module 116 determines whether one or more records in the third data structure contain the same entity name, then aggregates the monetary amount from each record into a new data element in the third data structure. FIG. 8 is a diagram of exemplary record aggregation for records in the third data structure as conducted by the data aggregation module 116. As shown in FIG. 8, the data aggregation module 116 analyzes the records in the third data structure (704 from FIG. 7) to identify a plurality of records that have the same entity name (e.g., Smith). Then, the module 116 combines the monetary amounts for this entity name into a data element in the third data structure (e.g., by adding the respective amounts together)—resulting in the updated third data structure 802 with aggregated monetary amount element 804.

The server computing device 106b can store the third data structure with aggregated enforcement fine amounts in database 118 for retrieval and use by other components of the system 100. For example, a user at remote computing device 102 can establish a communication session with the user interface (UI) module 108 of server computing device 106a to search for specific enforcement actions and/or entity names for which the database 118 includes aggregated enforcement fine amounts. Upon receiving, e.g., a search request, the UI module 108 can retrieve the third data structure from database 118 and generate a graphical user interface (GUI) screen for display on the remote computing device 102, where the GUI screen includes the associated entity information and/or enforcement action information. FIG. 9 is a diagram of an exemplary graphical user interface 900 for searching enforcement actions as generated by the UI module 108 for display on remote computing device 102. As shown in FIG. 9, the user interface 900 includes a search input section 902 and a search results section 904. A user at remote computing device 102 can provide one or more search terms in the plurality of input features in the search input section 902 (e.g., drop-down boxes, text input fields, date fields, etc.) and then activate the Search button to search for relevant enforcement action information stored in the third data structure (and in some embodiments, in the first and/or second data structures). The UI module 108 can retrieve relevant details from database 118 and present the information in the search results section 904.

In some embodiments, the search results can comprise a link that, when activated, causes the UI module 108 to generate a user interface with the relevant enforcement action details so the user at remote computing device 102 can view additional information about the specific enforcement action(s). FIG. 10 is a diagram of an exemplary graphical user interface 1000 for viewing enforcement action details as generated by the UI module 108 for display on remote computing device 102. As shown in FIG. 10, the user interface 1000 includes a summary of the search criteria 1002, a total of the enforcement fine amount 1004, a count of the number of enforcement actions that match the search criteria 1006, and a detail section 1008 that comprises the enforcement fine amount, the date of the enforcement action, the fine type, and a link to the text of the underlying enforcement action (e.g., a .pdf file of the SEC enforcement action). The user at remote computing device 102 can quickly and efficiently view the relevant enforcement details and review a copy of the actual enforcement action if desired.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computer system in which unstructured computer text is analyzed for generation of an enforcement action database using machine learning, the system comprising a computing device having a memory for storing computer-executable instructions and a processor that executes the computer-executable instructions to:

receive a digital document comprising a corpus of unstructured text;

convert each sentence in the corpus of unstructured text into a set of tokens;

identify one or more entities in each set of tokens and transform the identified entities into a normalized form;

classify each sentence in the corpus of unstructured text as relevant to an enforcement action or not relevant to an enforcement action;

for each sentence classified as relevant to an enforcement action:

generate a record in a first data structure, the record in the first data structure comprising a name of an entity in the sentence, a type of the entity in the sentence, and a first enforcement attribute;

generate a record in a second data structure, the record in the second data structure comprising the first enforcement attribute and a second enforcement attribute;

map the records in the first data structure to the records in the second data structure based upon the enforcement attribute in each data structure to generate a third data structure, each record in the third data structure comprising the name of the entity in the sentence, the type of the entity in the sentence, the first enforcement attribute, and the second enforcement attribute; and aggregate the records in the third data structure based upon the name of the entity in the sentence and the type of the entity in the sentence to determine an aggregated first enforcement attribute for each entity in the third data structure.

2. The system of claim 1, wherein converting each sentence in the corpus of unstructured text into a set of tokens comprises:

providing the corpus of unstructured text as input to a natural language processing algorithm;

parsing, by the natural language processing algorithm, the corpus of unstructured text to identify each sentence in the corpus of unstructured text; and generating, by the natural language processing algorithm, a token for each word in each sentence.

3. The system of claim 1, wherein identifying one or more entities in each set of tokens comprises, for each token in the set of tokens:

determining, for each token in the set of tokens, that the token is located in an entity database;

identifying an entity in the entity database that corresponds to the token; and assigning a name of the entity and a type of the entity to the token based upon the entity database.

4. The system of claim 1, wherein converting each sentence in the corpus of unstructured text into a set of tokens comprises removing one or more stopwords from the sentence.

5. The system of claim 1, wherein classifying each sentence in the corpus of unstructured text as relevant to an enforcement action or not relevant to an enforcement action comprises discarding sentences that are classified as not relevant to an enforcement action.

6. The system of claim 5, wherein the computing device classifies a sentence as relevant to an enforcement action when the sentence comprises one or more enforcement keywords and/or one or more enforcement fine amounts.

7. The system of claim 6, wherein the computing device classifies a sentence as relevant to an enforcement action when the one or more enforcement keywords are within a predetermined proximity to the one or more enforcement fine amounts.

8. The system of claim 5, wherein the computing device classifies a sentence as not relevant to an enforcement action when the sentence comprises one or more entities that are unrelated to an enforcement action.

9. The system of claim 8, wherein the one or more entities are unrelated to an enforcement action when the one or more entities are of a type that is unrelated to an enforcement action.

10. The system of claim 1, wherein mapping the records in the first data structure to the records in the second data structure based upon the enforcement fine amount in each data structure comprises:

selecting a first record from the first data structure that has a first enforcement attribute;

selecting one or more records from the second data structure that have a second enforcement attribute that matches the first enforcement attribute; and merging the first record from the first data structure and the selected one or more records from the second data structure to create a new set of records.

11. The system of claim 10, wherein the computing device inserts the new set of records into the third data structure.

12. The system of claim 1, wherein the computing device generates a visual representation of the records from the third data structure for display on a remote computing device.

13. A computerized method in which unstructured computer text is analyzed for generation of an enforcement action database using machine learning, the method comprising:

receiving, by a computing device, a digital document comprising a corpus of unstructured text;

converting, by a computing device, each sentence in the corpus of unstructured text into a set of tokens;

identify one or more entities in each set of tokens and transform the identified entities into a normalized form;

classify each sentence in the corpus of unstructured text as relevant to an enforcement action or not relevant to an enforcement action;

for each sentence classified as relevant to an enforcement action:

generate a record in a first data structure, the record in the first data structure comprising a name of an entity in the sentence, a type of the entity in the sentence, and a first enforcement attribute;

generate a record in a second data structure, the record in the second data structure comprising the first enforcement attribute and a second enforcement attribute;

map the records in the first data structure to the records in the second data structure based upon the enforcement attribute in each data structure to generate a third data structure, each record in the third data structure comprising the name of the entity in the sentence, the type of the entity in the sentence, the first enforcement attribute, and the second enforcement attribute; and aggregate the records in the third data structure based upon the name of the entity in the sentence and the type of the entity in the sentence to determine an aggregated first enforcement attribute for each entity in the third data structure.

14. The method of claim 13, wherein converting each sentence in the corpus of unstructured text into a set of tokens comprises:

providing the corpus of unstructured text as input to a natural language processing algorithm;

parsing, by the natural language processing algorithm, the corpus of unstructured text to identify each sentence in the corpus of unstructured text; and generating, by the natural language processing algorithm, a token for each word in each sentence.

15. The method of claim 13, wherein identifying one or more entities in each set of tokens comprises, for each token in the set of tokens:

determining, for each token in the set of tokens, that the token is located in an entity database;

identifying an entity in the entity database that corresponds to the token; and assigning a name of the entity and a type of the entity to the token based upon the entity database.

16. The method of claim 13, wherein converting each sentence in the corpus of unstructured text into a set of tokens comprises removing one or more stopwords from the sentence.

17. The method of claim 13, wherein classifying each sentence in the corpus of unstructured text as relevant to an enforcement action or not relevant to an enforcement action comprises discarding sentences that are classified as not relevant to an enforcement action.

18. The method of claim 17, wherein the computing device classifies a sentence as relevant to an enforcement action when the sentence comprises one or more enforcement keywords and/or one or more enforcement fine amounts.

19. The method of claim 18, wherein the computing device classifies a sentence as relevant to an enforcement action when the one or more enforcement keywords are within a predetermined proximity to the one or more enforcement fine amounts.

20. The method of claim 18, wherein the computing device classifies a sentence as not relevant to an enforcement action when the sentence comprises one or more entities that are unrelated to an enforcement action.

21. The method of claim 20, wherein the one or more entities are unrelated to an enforcement action when the one or more entities are of a type that is unrelated to an enforcement action.

22. The method of claim 13, wherein mapping the records in the first data structure to the records in the second data structure based upon the enforcement fine amount in each data structure comprises:
  selecting a first record from the first data structure that has a first enforcement fine amount;
  selecting one or more records from the second data structure that have a second enforcement attribute that matches the first enforcement attribute; and
  merging the first record from the first data structure and the selected one or more records from the second data structure to create a new set of records.

23. The method of claim 22, wherein the computing device inserts the new set of records into the third data structure.

24. The method of claim 13, wherein the computing device generates a visual representation of the records from the third data structure for display on a remote computing device.

* * * * *